(12) United States Patent
Takii et al.

(10) Patent No.: US 12,066,162 B2
(45) Date of Patent: Aug. 20, 2024

(54) VEHICULAR LAMP AND VEHICULAR LAMP CONTROL METHOD

(71) Applicant: KOITO MANUFACTURING CO., LTD., Tokyo (JP)

(72) Inventors: Naoki Takii, Shizuoka (JP); Naohisa Tatara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 186 days.

(21) Appl. No.: 17/620,853

(22) PCT Filed: Jun. 17, 2020

(86) PCT No.: PCT/JP2020/023826
§ 371 (c)(1),
(2) Date: Dec. 20, 2021

(87) PCT Pub. No.: WO2020/256027
PCT Pub. Date: Dec. 24, 2020

(65) Prior Publication Data
US 2022/0349547 A1 Nov. 3, 2022

(30) Foreign Application Priority Data

Jun. 20, 2019 (JP) ................................ 2019-114172
Jun. 20, 2019 (JP) ................................ 2019-114173

(51) Int. Cl.
*F21S 41/675* (2018.01)
*B60Q 1/076* (2006.01)
(Continued)

(52) U.S. Cl.
CPC ............ *F21S 41/675* (2018.01); *B60Q 1/076* (2013.01); *F21S 41/148* (2018.01); *F21S 41/25* (2018.01); *G02B 26/10* (2013.01); *F21Y 2115/10* (2016.08)

(58) Field of Classification Search
CPC ........ F21S 41/675; F21S 41/148; F21S 41/25; F21S 41/255; F21S 41/321; F21S 41/336;
(Continued)

(56) References Cited

U.S. PATENT DOCUMENTS

2013/0038736 A1 2/2013 Yamamura
2016/0341390 A1 11/2016 Yamamura et al.
(Continued)

FOREIGN PATENT DOCUMENTS

CN 106030197 A 10/2016
CN 107107809 A 8/2017
(Continued)

OTHER PUBLICATIONS

International Search Report issued in corresponding International Application No. PCT/JP2020/023826; mailed Aug. 18, 2020 (8 pages).
(Continued)

*Primary Examiner* — Minh D A
(74) *Attorney, Agent, or Firm* — Osha Bergman Watanabe & Burton LLP

(57) ABSTRACT

A vehicle lamp includes a light source, a lighting control unit configured to control an emission timing of light emitted from the light source, and a rotary scanning unit configured to repeatedly perform scanning with the light emitted from the light source while rotating. The vehicle lamp illuminates a predetermined region with scan light. The rotary scanning unit performs plural repetitive scans in one rotation. The lighting control unit detects a rotation cycle of the rotary scanning unit, and controls the emission timing of the light source at a timing obtained by equally dividing the detected rotation cycle.

15 Claims, 15 Drawing Sheets

(51) Int. Cl.
*F21S 41/148* (2018.01)
*F21S 41/25* (2018.01)
*G02B 26/10* (2006.01)
*F21Y 115/10* (2016.01)

(58) Field of Classification Search
CPC ............... B60Q 1/076; B60Q 2300/42; B60Q 2300/45; B60Q 1/0023; B60Q 1/0041; B60Q 1/143; G02B 26/10; F21Y 2115/10; F21W 2102/13; F21W 2107/10
See application file for complete search history.

(56) References Cited

U.S. PATENT DOCUMENTS

| | | | |
|---|---|---|---|
| 2017/0159903 | A1 | 6/2017 | Yamamura |
| 2017/0159904 | A1 | 6/2017 | Yamamura |
| 2017/0185855 | A1 | 6/2017 | Yamamura |
| 2017/0282786 | A1 | 10/2017 | Toda et al. |
| 2018/0043820 | A1* | 2/2018 | Murakami ......... H05B 45/3725 |
| 2018/0112843 | A1 | 4/2018 | Sone |
| 2018/0112845 | A1 | 4/2018 | Tanaka et al. |
| 2018/0209606 | A1* | 7/2018 | Nakano ................... F21S 41/25 |
| 2018/0332680 | A1 | 11/2018 | Ichikawa |
| 2018/0372295 | A1* | 12/2018 | Kikuchi ................ F21S 41/153 |
| 2020/0047661 | A1 | 2/2020 | Takii et al. |
| 2020/0340639 | A1 | 10/2020 | Yamamura |
| 2021/0389467 | A1* | 12/2021 | Eshel ..................... G01S 17/931 |

FOREIGN PATENT DOCUMENTS

| | | |
|---|---|---|
| CN | 107965732 A | 4/2018 |
| CN | 108882438 A | 11/2018 |
| JP | 2017059546 A | 3/2017 |
| JP | 2018073485 A | 5/2018 |
| JP | 2018190701 A | 11/2018 |
| JP | 2020026170 A | 2/2020 |
| WO | 2015122303 A1 | 8/2015 |
| WO | 2016104319 A1 | 6/2016 |
| WO | 2016167250 A1 | 10/2016 |

OTHER PUBLICATIONS

Written Opinion of the International Searching Authority issued in corresponding International Application No. PCT/JP2020/023826; dated Aug. 18, 2020 (5 pages).

Office Action issued in counterpart Chinese Application No. 202080045094.8, dated Jul. 2, 2024 (17 pages).

* cited by examiner

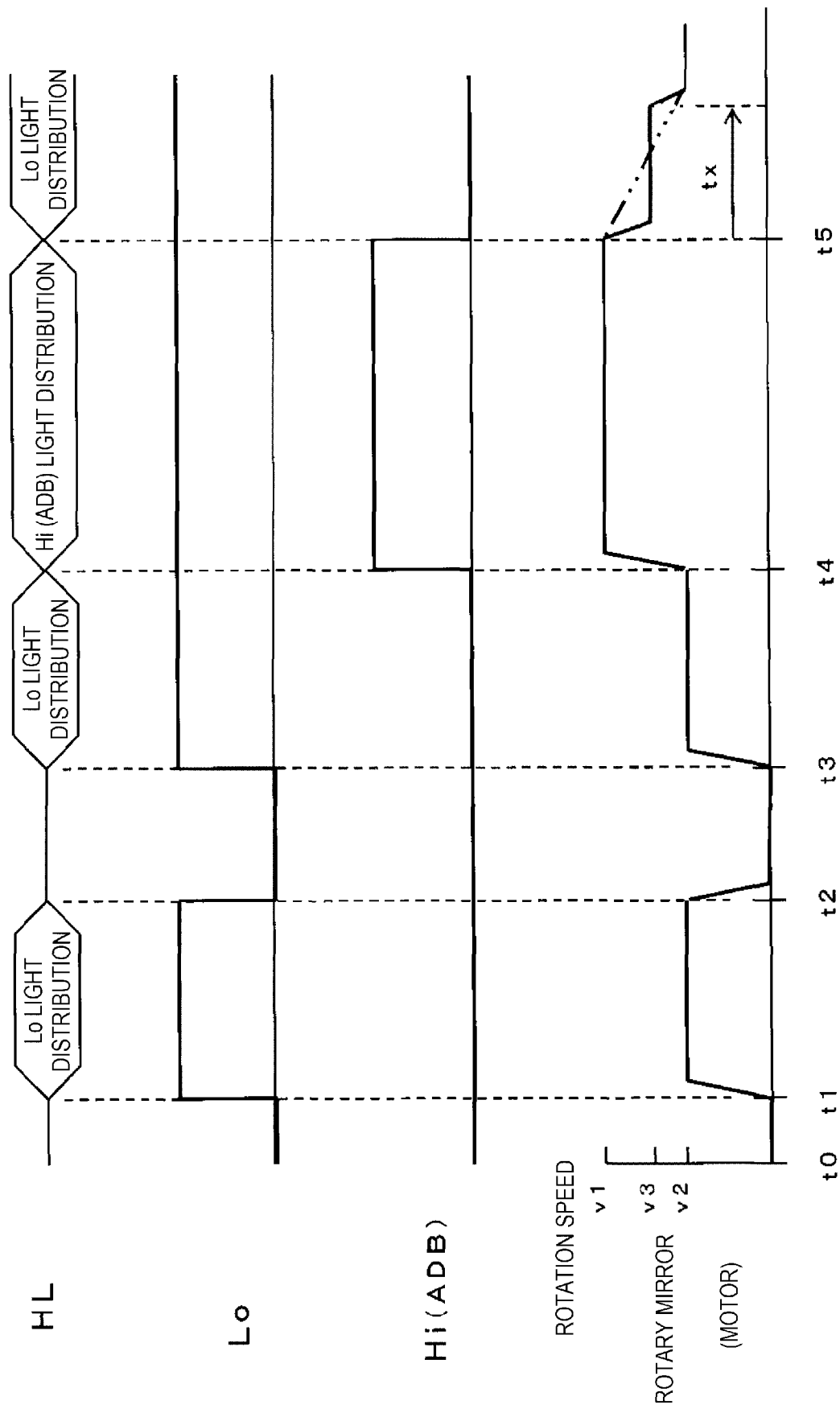

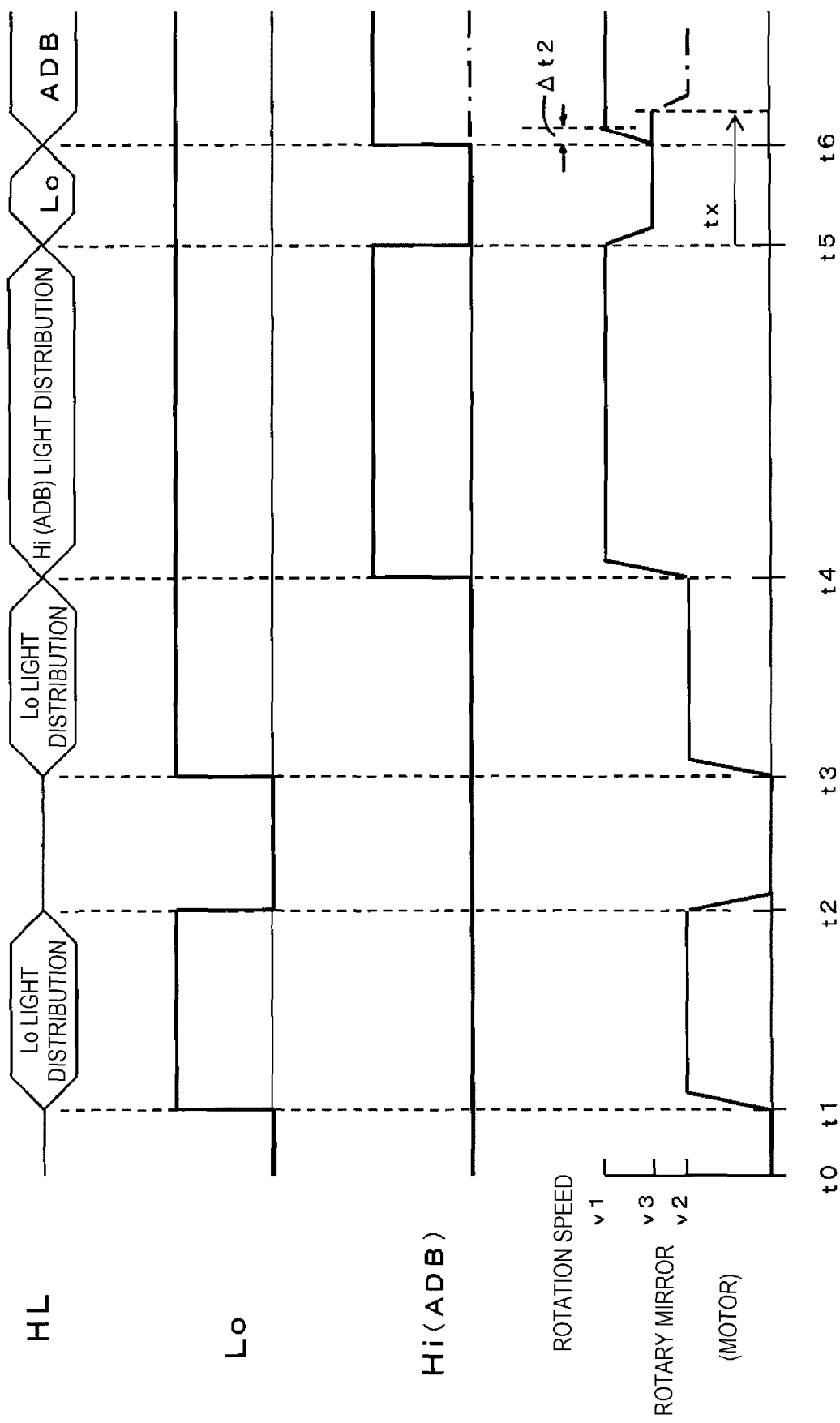

VEHICULAR LAMP AND VEHICULAR LAMP CONTROL METHOD

TECHNICAL FIELD

The present disclosure relates to a vehicle lamp that performs illumination of an optical scanning system, and a method for controlling a vehicle lamp.

BACKGROUND ART

There is known a technique of detecting an object such as a preceding vehicle, an oncoming vehicle, or a pedestrian present in a front region of an automobile and performing light distribution control such that the detected object would not be dazzled. For example, when a region above a cutoff line of a low beam light distribution is illuminated under adaptive driving beam (ADB) light distribution control of the automobile, the light distribution is controlled such that the object present in the region would selectively be not illuminated. In the ADB light distribution control, a lamp of an optical scanning system is employed.

As a vehicle lamp that performs illumination of an optical scanning system, a headlamp is known to use a scanning mirror that performs light radiation while changing a radiation direction of light emitted from a light source. For example, a headlamp of Patent Literature 1 includes, as a scanning mirror, a rotary mirror (rotary reflector) that reflects light from a light source, and the rotary mirror is rotationally driven by a motor to change a reflection angle of the rotary mirror and a light radiation direction, thereby performing optical scanning.

CITATION LIST

Patent Literature

Patent Literature 1: WO 2016/104319
Patent Literature 2: JP2020-026170A

SUMMARY OF INVENTION

Technical Problem

When controlling the optical scanning by the rotary mirror, it is required to detect a rotation position of the rotary mirror and control rotation of the motor based on the detected rotation position. Patent Literature 1 describes, as a technique of detecting the rotation position of the rotary mirror, a technique of detecting a position of a blade (light reflecting blade) of the rotary mirror and a technique of detecting a rotation position of the motor using a Hall element. Patent Literature 1 does not describe a detailed description of a specific configuration of a position detection unit. The former technique is assumed to be a technique of detecting the position of the blade using a photo interrupter and the like, and the latter technique is assumed to be a technique of detecting a magnetic pole position of a magnet constituting a rotor of the motor.

In the technique using a position detection unit such as a photo interrupter, it is necessary to dispose the position detection unit in a vicinity of the blade of the rotary mirror. It is difficult to reduce a size of this type of position detection unit and it is necessary to ensure a space for disposing the position detection unit in the vicinity of the rotary mirror, and thus it is difficult to reduce a size of the rotary mirror. In addition, the position detection unit such as a photo interrupter is generally expensive, and thus it is difficult to reduce the cost of the rotary mirror.

On the other hand, in the technique using the Hall element, it is easy to reduce the size and the cost of the rotary mirror since the Hall element is small and relatively inexpensive. However, since the Hall element detects the rotation position of the motor, a detection error may occur between a detected rotation position and an actual rotation position of the rotary mirror when a position deviation in a rotation direction occurs between the motor and the blade attached to the motor. In particular, when an S pole and an N pole of the magnet of the motor vary in position in the rotation direction, this variation directly leads to a detection error. When such a detection error occurs, optical scanning with the rotary mirror with high accuracy is difficult even when the rotation of the motor is accurately controlled.

In Patent Literature 1, in order to implement illumination of a desired region under the ADB light distribution control, it is necessary to match light emission of the light source and a rotation timing of the rotary mirror. When the rotary mirror starts rotating in accordance with a timing of the ADB light distribution control, the illumination flickers due to fluctuation of a motor rotation speed during rise time from start of the motor to stabilization of the rotation speed. As a result, in Patent Literature 1, light distribution characteristics are deteriorated and a driver feels uncomfortable.

Further, when the rotary mirror stops rotating when no ADB light distribution control is performed, viscosity of lubricating oil of a bearing of the motor such as a ball bearing or a sliding bearing changes when the rotary mirror stops rotating. This may degrade lubricity of the lubricating oil and shorten life of the bearing. In particular, when the rotary mirror is stopped when the lamp is turned on with the low beam light distribution, an undesirable influence is exerted on the lubricating oil due to a temperature rise of the headlamp caused by lighting.

In Patent Literature 2, a rotary mirror is continuously rotated even when ADB light distribution control is stopped. When the rotary mirror is continuously rotated in this manner, lubricity of lubricating oil may be prevented from degrading. However, in Patent Literature 2, the rotary mirror is always rotated at a predetermined rotation speed, that is, at a rotation speed when the ADB light distribution control is performed. Accordingly, when lighting time of a headlamp is long, a total rotation number of the rotary mirror increases and wear of a bearing of a motor progresses. As a result, life of a rotary scanning unit including the motor and the rotary mirror may be shortened.

An object of the present disclosure is to provide a small vehicle lamp that can perform optical scanning with a rotary mirror with high accuracy.

The object of the present disclosure is further to provide a vehicle lamp having extended life of a rotary scanning unit, and a control method therefor.

Solution to Problem

A vehicle lamp according to the present disclosure includes:
a light source;
a lighting control unit configured to control an emission timing of light emitted from the light source; and
a rotary scanning unit configured to repeatedly perform scanning with the light emitted from the light source while rotating.

The vehicle lamp illuminates a predetermined region with scan light.

The rotary scanning unit performs plural repetitive scans in one rotation.

The lighting control unit detects a rotation cycle of the rotary scanning unit, and controls the emission timing of the light source at a timing obtained by equally dividing the detected rotation cycle.

In the present disclosure, the rotary scanning unit may include a rotary mirror, the rotary motor including plural light reflecting blades of the same shape arranged in a rotation direction, and a motor configured to rotationally drive the rotary mirror. The lighting control unit may include a cycle detection unit configured to detect a rotation cycle of the motor, and a cycle division unit configured to detect a division cycle obtained by equally dividing the detected rotation cycle into plural parts. The lighting control unit may control the emission timing of the light source based on the detected rotation cycle and the detected division cycle.

A vehicle lamp according to the present disclosure includes: a first lamp configured to perform illumination with a first light distribution; a second lamp configured to perform illumination with a second light distribution different from the first light distribution; and a lamp control unit configured to control a rotation speed of a rotary scanning unit of the second lamp. The second lamp includes the rotary scanning unit configured to perform scanning with light emitted from a light source while rotating. The lamp control unit controls the rotation speed of the rotary scanning unit when the first lamp is turned on and the second lamp is turned on to be a first rotation speed, and controls the rotation speed of the rotary scanning unit when the first lamp is turned on and the second lamp is turned off to be another rotation speed lower than the first rotation speed.

The rotary scanning unit of the vehicle lamp according to the present disclosure may include a motor and a rotary mirror configured to be rotationally driven by the motor and reflect the light emitted from the light source in different directions according to a change in a rotation position. The motor may include a bearing lubricated by a lubricant.

The lamp control unit of the present disclosure may control the rotation speed of the rotary scanning unit when the second lamp is turned off to be a second rotation speed lower than the first rotation speed. The lamp control unit may control the rotation speed of the rotary scanning unit to a third rotation speed lower than the first rotation speed and higher than a second rotation speed lower than the first rotation speed during predetermined time from when the second lamp is turned off. The lamp control unit may continuously or stepwise change the rotation speed of the rotary scanning unit from the first rotation speed to a second rotation speed lower than the first rotation speed during predetermined time from when the second lamp is turned off.

The present disclosure provides a method for controlling a vehicle lamp. The vehicle lamp includes a first lamp that performs illumination with a first light distribution, a second lamp that performs illumination with a second light distribution different from the first light distribution, and a lamp control unit that controls a lighting state of a light source of the second lamp. The second lamp includes a rotary scanning unit configured to perform scanning with light emitted from the light source. The method for controlling the vehicle lamp includes controlling, by the lamp control unit, a rotation speed of the rotary scanning unit to be a first rotation speed when the first lamp is turned on and the second lamp is turned on, and controlling the rotation speed of the rotary scanning unit to be a second rotation speed lower than the first rotation speed when the first lamp is turned on and the second lamp is turned off.

Advantageous Effects of Invention

According to the present disclosure, the lighting control unit detects the rotation cycle of the rotary scanning unit and controls the emission timing of the light source at a timing obtained by equally dividing the detected rotation cycle. Accordingly, it is possible to provide a vehicle lamp that can control the emission timing of the light source and perform ADB control with high accuracy.

Further, in the present disclosure, the rotation speed of the rotary scanning unit when the lamp is turned off is controlled to be lower than the rotation speed when the lamp is turned on. Accordingly, lubricity of the bearing in the rotary scanning unit can be improved, the total number of rotations of the rotary scanning unit can be reduced, and the life of the rotary scanning unit can be extended.

BRIEF DESCRIPTION OF DRAWINGS

FIG. 14 is a timing chart of lighting control according to a second embodiment of the present disclosure.

FIG. 15 is a timing chart of lighting control according to a modification of the second embodiment.

DESCRIPTION OF EMBODIMENTS

Figure 1:
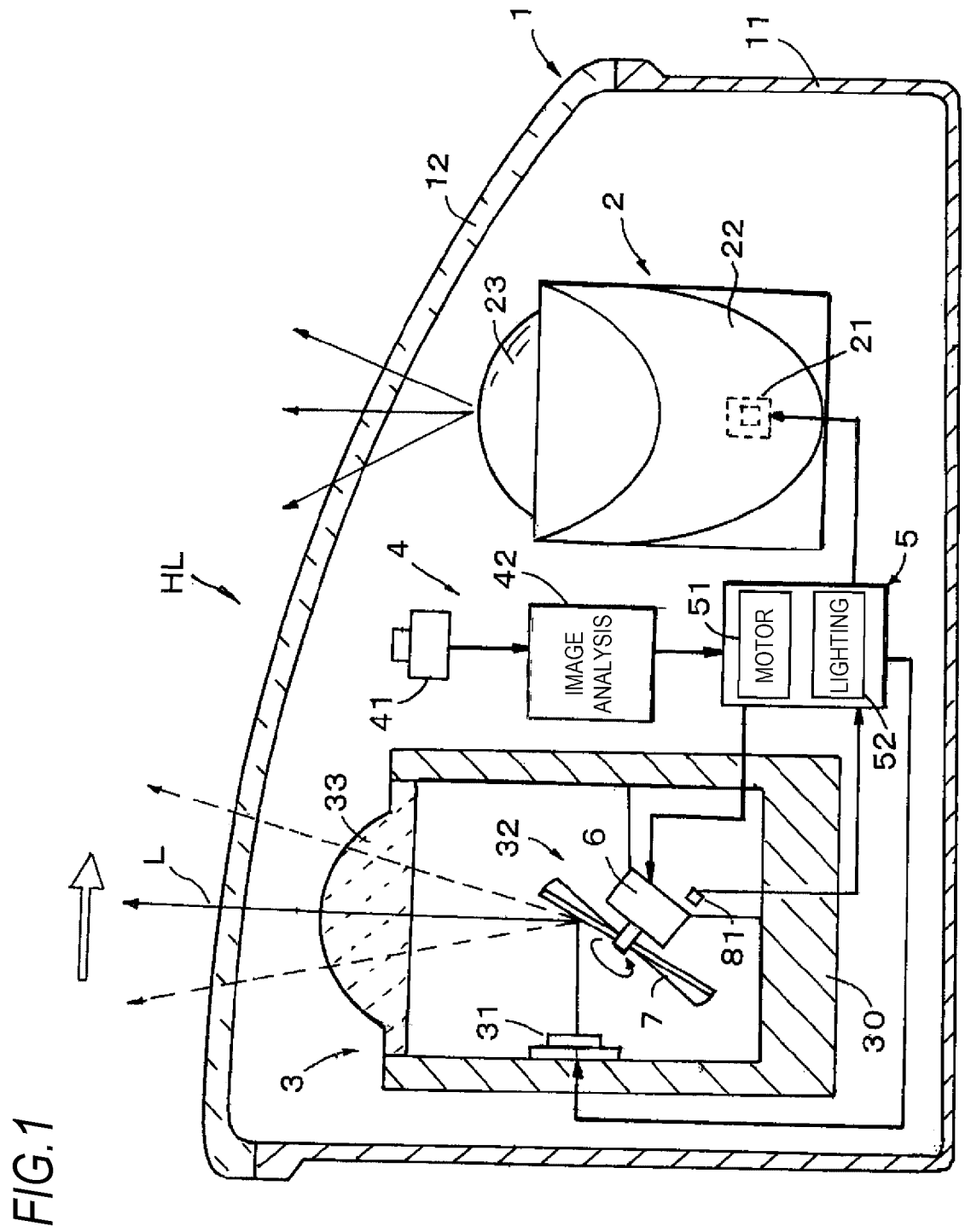
FIG. 1 is a schematic horizontal sectional view of a headlamp of an automobile to which the present disclosure is applied.

Next, embodiments of the present disclosure will be described with reference to the drawings. FIG. 1 is a schematic horizontal sectional view of a headlamp HL (vehicle lamp that illuminates a predetermined region) of an automobile to which the present disclosure is applied. The headlamp HL includes a lamp housing 1 including a lamp body 11 and a translucent front cover 12. The headlamp HL further includes a low beam lamp unit 2 and a high beam lamp unit 3 housed in the lamp housing 1. In the following description, a front-rear direction is a direction based on a front-rear direction of the automobile and the lamp.

The low beam lamp unit 2 is a first lamp that performs illumination with a first light distribution in the present disclosure, and is a projector-type lamp unit. The low beam lamp unit 2 includes a first white light emitting diode (LED) 21 that is a light source that emits white light, a reflector 22 that reflects the white light emitted from the first white LED 21 in a converged state, and a projection lens 23 that projects the white light condensed by the reflector 22 to a front region.

The high beam lamp unit 3 is a second lamp that performs illumination with a second light distribution different from the first light distribution in the present disclosure, and is a lamp unit under ADB light distribution control of an optical scanning system. The high beam lamp unit 3 includes a second white LED 31 that emits white light, a rotary scanning unit 32 that reflects the white light emitted from the second white LED 31 and deflects a reflection direction of the white light in a horizontal direction, and a projection lens 33 that projects the reflected white light to the front region of the automobile.

The lamp housing 1 houses an object detection device 4 (object detection unit) and a lighting control device 5 (lamp control unit). The object detection device 4 includes an imaging element 41 that captures an image of the front region of the automobile, and an image analysis unit 42 that analyzes the image captured by the imaging element 41 and detects an object. When an object is present in the front region of the automobile, the object is captured by the imaging element 41 and detected by the image analysis unit 42, and position information including a position and a direction of the object relative to the automobile is detected. The lighting control device 5 controls light emission (emission timing) of the second white LED 31 based on the detected position information on the object. The object detection device 4 may be provided outside the lamp housing 1. For example, the object detection device 4 may be provided in a position in a vehicle interior of the automobile where the object detection device 4 faces a windshield, or at a front bumper or a roof.

Figure 2:
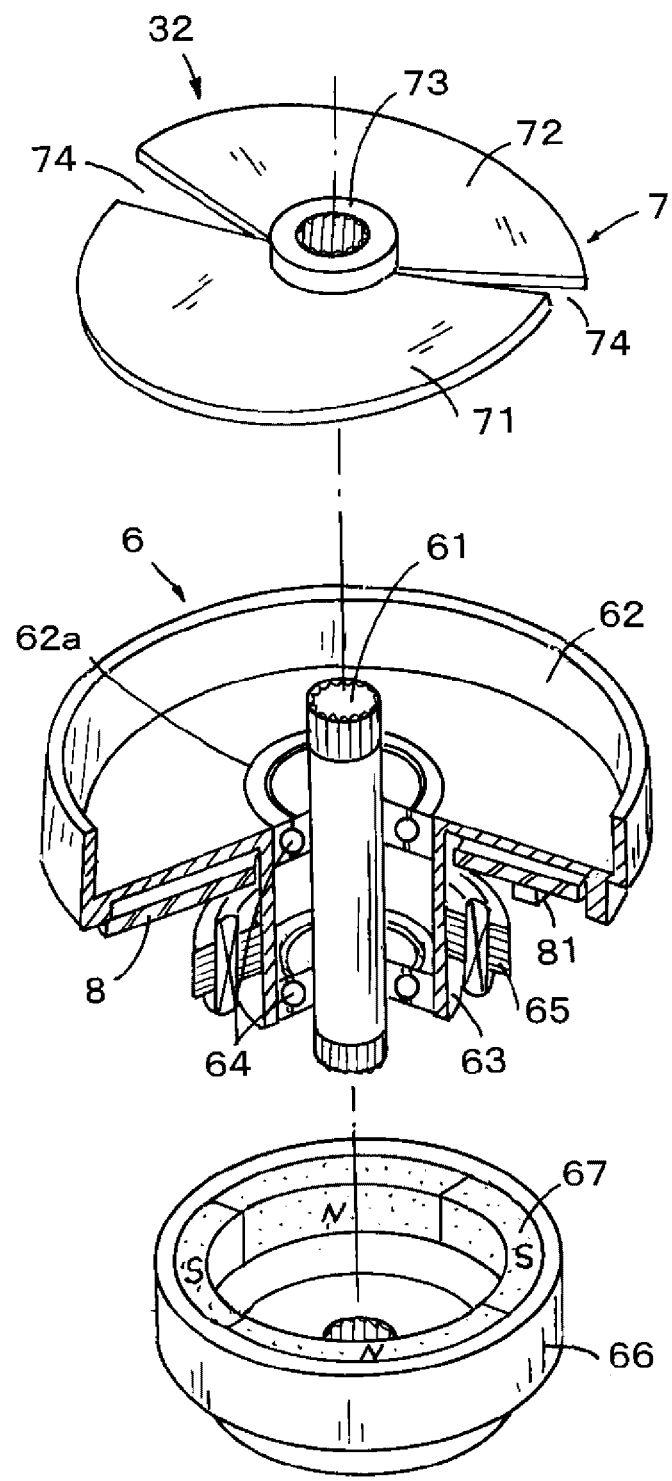
FIG. 2 is a schematic perspective view of a rotary scanning unit with a part thereof cut away.

FIG. 2 is a schematic perspective view of the rotary scanning unit 32 with a part thereof cut away. The rotary scanning unit 32 includes a brushless motor (hereinafter, referred to as a motor) 6 and a rotary mirror 7 rotationally driven by the motor 6. In the rotary mirror 7, two semicircular light reflecting blades (hereinafter, simply referred to as blades) 71, 72 are supported by a boss 73, and the rotary mirror 7 is formed in a substantial disk shape as a whole. The boss 73 is integrally supported in a rotation direction by a spline or the like at one end portion of a rotation shaft 61 of the motor 6. A front surface of each of the blades 71, 72, that is, a surface facing obliquely front of the automobile is a light reflecting surface. The two blades 71, 72 have the same shape and are integrally formed with the boss 73 by resin molding. At least the front surfaces of the blades 71, 72 are formed with a light reflection film obtained by vapor deposition, plating, or the like of an aluminum film.

The two blades 71, 72 have a point-symmetrical shape relative to the boss 73. An inclination angle of each of the front surfaces that are the light reflecting surfaces, that is, an inclination angle relative to a plane perpendicular to an axial direction of the rotation shaft 61 of the motor 6, continuously (gradually) changes along the rotation direction. Accordingly, when the rotary mirror 7 is rotationally driven by the motor 6, an angle in a horizontal direction of each of the reflecting surfaces facing the second white LED 31 continuously changes. The rotary mirror 7 performs scanning with the white light of the second white LED 31 in the horizontal direction by this angle change. In other words, the rotary mirror 7 reflects the light emitted from the second white LED 31 in different directions according to a change in a rotation position of the rotary mirror 7. A gap extending in a radial direction is provided between the two blades 71, 72 in a circumferential direction. The gap is a non-reflective region 74 that does not reflect light.

Figure 3:
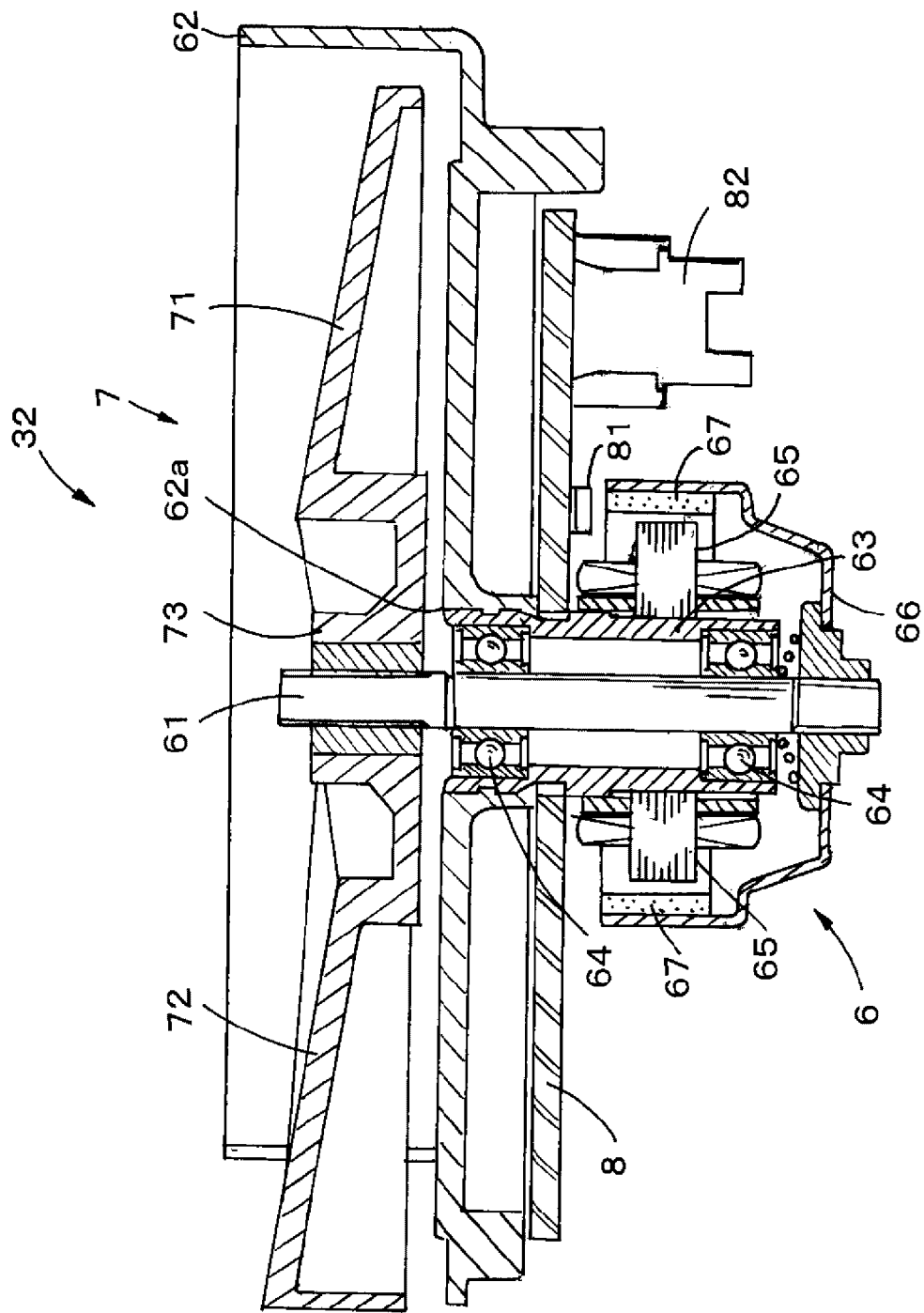
FIG. 3 is a sectional view of the rotary scanning unit.

FIG. 3 is a sectional view of the motor 6 and the rotary mirror 7. The motor 6 is assembled to a base 62 having a circular shallow dish shape. A stator tube 63 is fixed to the base 62 while facing a hole 62a opened in a central position. The rotation shaft 61 is axially rotatably supported by a pair of ball bearings 64 disposed inside the stator tube 63. The pair of ball bearings 64 are spaced apart from each other in a tubular axial direction. The one end portion of the rotation shaft 61 extends to a front surface side of the base 62. The rotary mirror 7 is attached to the one end portion of the rotation shaft 61.

On an outer circumferential surface of the stator tube 63, plural (here, four) coils 65 are disposed at equal intervals in the circumferential direction. Each of the plural coils 65 is formed by a conductive wire wound around a core (iron core). The coils 65 constitute a stator of the motor 6 together with the stator tube 63.

A rotor yoke 66 having a short cylindrical container shape is attached to the other end portion of the rotation shaft 61. The rotor yoke 66 is disposed in an outer circumferential position where the rotor yoke 66 covers the stator tube 63 and the coils 65. The rotor yoke 66 is made of a ferromagnetic material, and is integrally attached to the other end portion of the rotation shaft 61 at a center of a circular bottom wall of the rotor yoke 66. A cylindrical magnet 67 is attached to an inner surface of a circumferential wall of the rotor yoke 66. In the magnet 67, as shown in FIG. 2, plural pairs of magnetic poles are magnetized in a region substantially equally divided into four parts in the circumferential direction. The magnetic poles of S poles and N poles are alternately arranged. In the circumferential direction, one magnetic pole of the plural pairs of magnetic poles is located corresponding to one light reflecting blade. The magnet 67 constitutes a rotor of the motor 6 together with the rotor yoke 66.

A circuit board 8 is attached to a back surface side of the base 62. Circuit components constituting the lighting control device 5 are mounted on the circuit board 8. The lighting control device 5 includes a motor control unit 51 and a lighting control unit 52. The motor control unit 51 controls rotation of the motor 6, and the lighting control unit 52 controls lighting states of the first white LED 21 (low beam lamp unit 2) and the second white LED 31 (high beam lamp unit 3). One of the circuit components, a Hall element 81 that detects a rotation state of the motor 6, is mounted on the circuit board 8. A connector 82 that electrically connects an external power supply or the like is mounted on the circuit board 8.

Normally, at least one Hall element 81 is disposed in a part in the circumferential direction. A rotation state of the rotor yoke 66, that is, the rotation shaft 61, is detected by detecting changes in the S poles and the N poles of the magnet 67 using a Hall effect of the Hall element 81. Based on this detection, power supply to the coils 65 is controlled to control the rotation of the motor 6. A detailed description of the motor control by the Hall element 81 will be omitted. To control the motor with high accuracy, two or three Hall elements 81 may be provided.

In the present disclosure, the lighting control unit 52 controls the lighting state, that is, light emission and extinction (including dimming), of the second white LED 31 of the high beam lamp unit 3 based on a detection signal detected by the Hall element 81.

Figure 4:
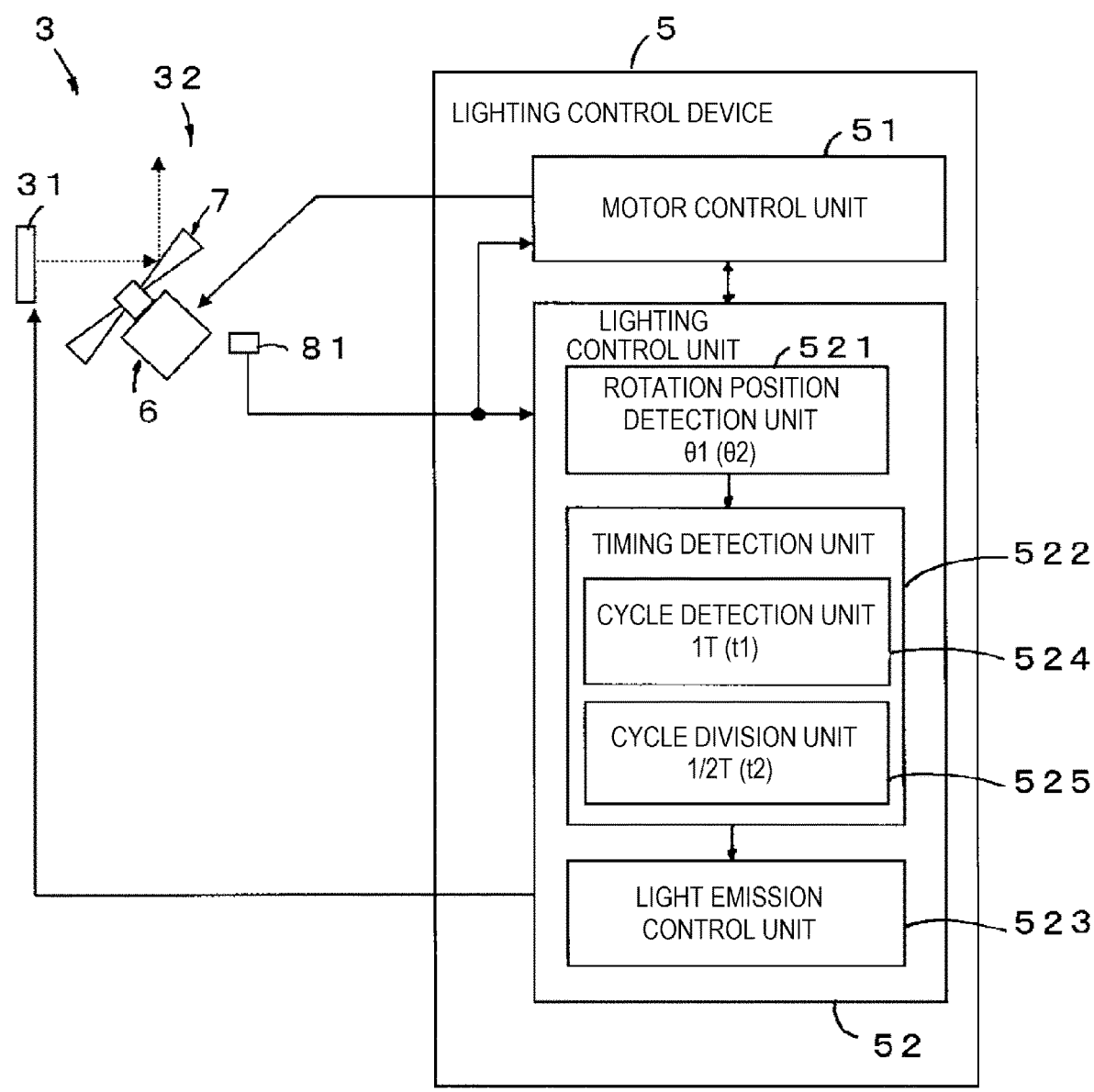
FIG. 4 is a part of a block diagram of a lighting control device.

FIG. 4 is a part of a block diagram of the lighting control device 5. Although details will be described later, the lighting control unit 52 includes a rotation position detection unit 521 that detects rotation positions of the motor 6 and the rotary mirror 7 based on the detection signal of the Hall element 81, a timing detection unit 522 that detects a light emission timing from the detected rotation positions, and a light emission control unit 523 that controls light emission of the second white LED 31 based on the detected timing.

Figure 5:
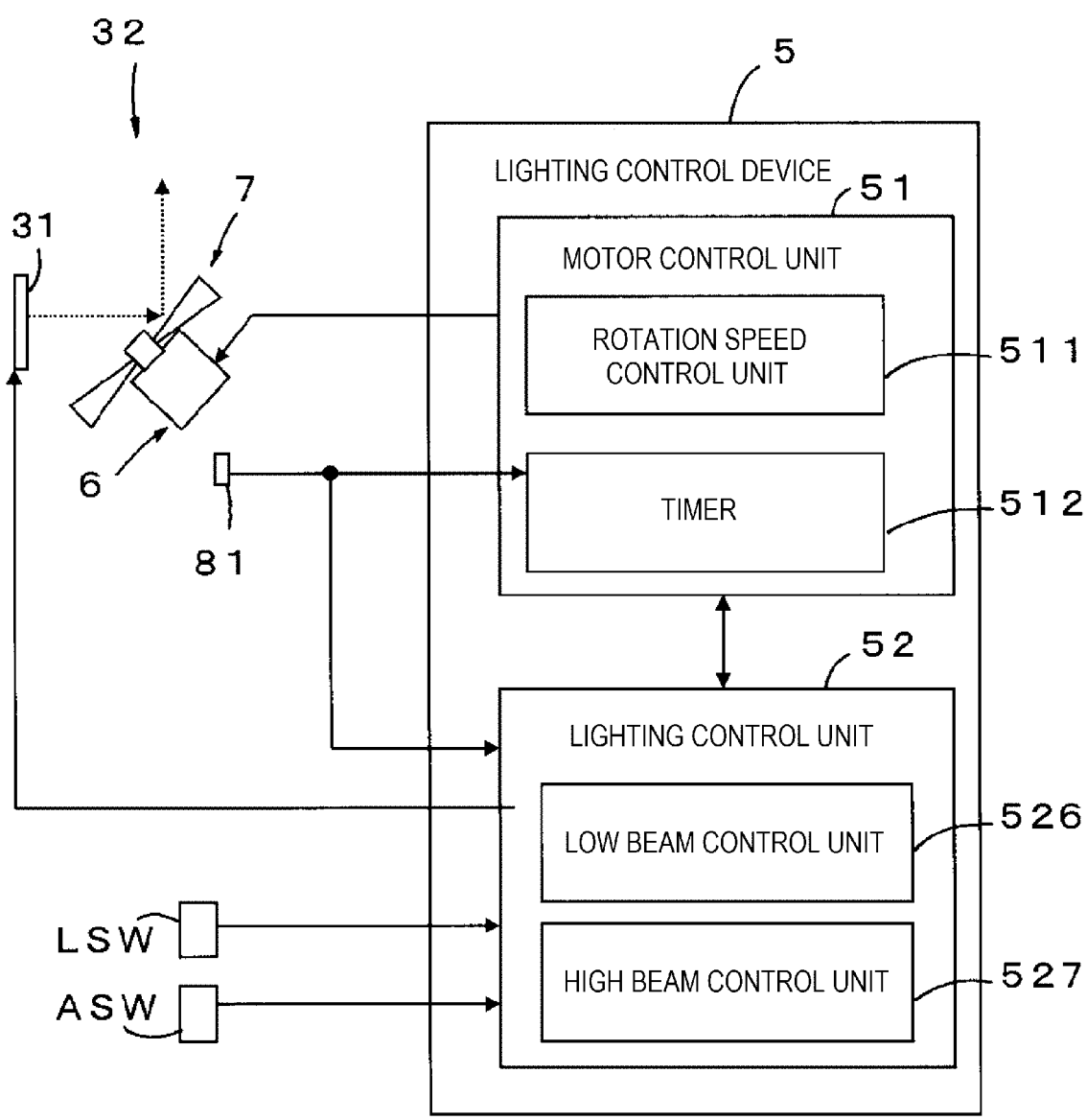
FIG. 5 is another part of the block diagram of the lighting control device.

FIG. 5 is another part of the block diagram of the lighting control device (lamp control unit) 5. The lighting control unit 52 includes a low beam control unit 526 that controls light emission of the first white LED 21 of the low beam lamp unit 2 based on an ON signal of a lamp switch LSW, and a high beam control unit 527 that controls light emission of the second white LED 31 of the high beam lamp unit 3. When an ADB switch ASW is turned on to the ADB light distribution control, the high beam control unit 527 can control the light emission of the second white LED 31 based on the detection signal detected by the Hall element 81.

The motor control unit 51 includes a rotation speed control unit 511 that controls a rotation speed of the motor 6. The rotation speed control unit 511 controls the rotation speed of the motor 6 based on a lighting control state by the lighting control unit 52, that is, light emission states of the first white LED 21 and the second white LED 31. Here, the rotation speed control unit 511 can control the motor 6 to a predetermined first rotation speed set in advance to rotate the rotary mirror 7 at a predetermined rotation speed when performing the ADB light distribution control. It is also possible to control the rotation speed to a rotation speed lower than the first rotation speed. The motor control unit 51 further includes a timer 512 for implementing the embodiment of the present disclosure.

Figure 6A:
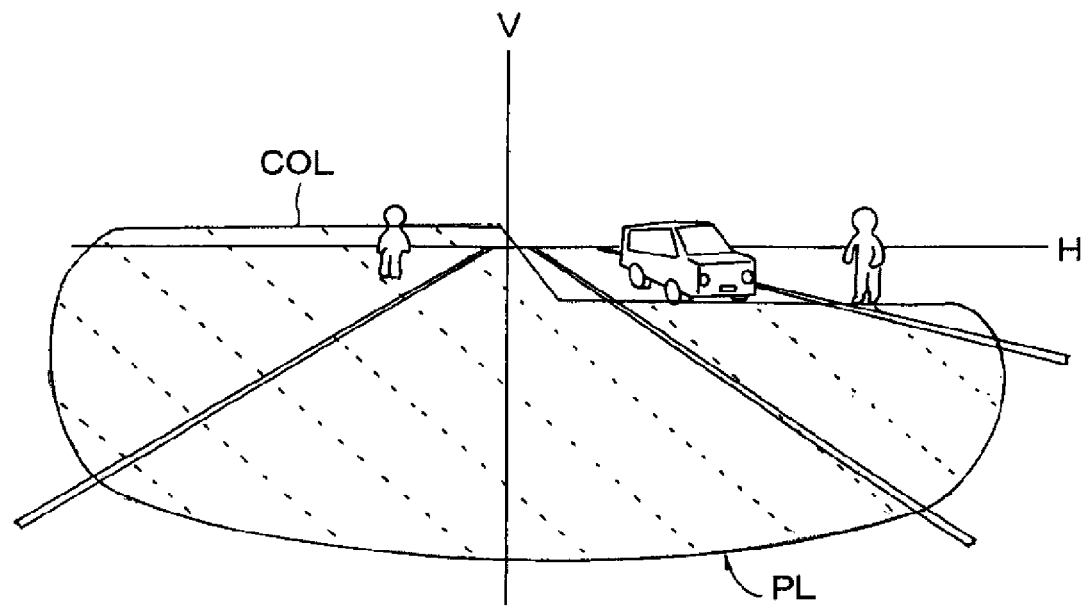
FIG. 6A is a light distribution characteristic diagram of a low beam light distribution.

In the headlamp HL, when the lamp switch LSW is turned on and the low beam lamp unit 2 is turned on by the lighting control unit 52 (low beam control unit 526) of the lighting control device 5, a low beam light distribution region PL (Lo light distribution illumination) is illuminated as shown in a light distribution characteristic diagram of FIG. 6A. That is, when the first white LED 21 emits light, the first white LED 21 has a cutoff line COL extending substantially along a horizontal line H in the front region of the automobile, and illuminates the low beam light distribution region (region indicated by a broken line extending upward to left) PL below the cutoff line COL. A height of the cutoff line COL differs between a right side (oncoming lane side) and a left side (own lane side) of a vertical line V.

Figure 6B:
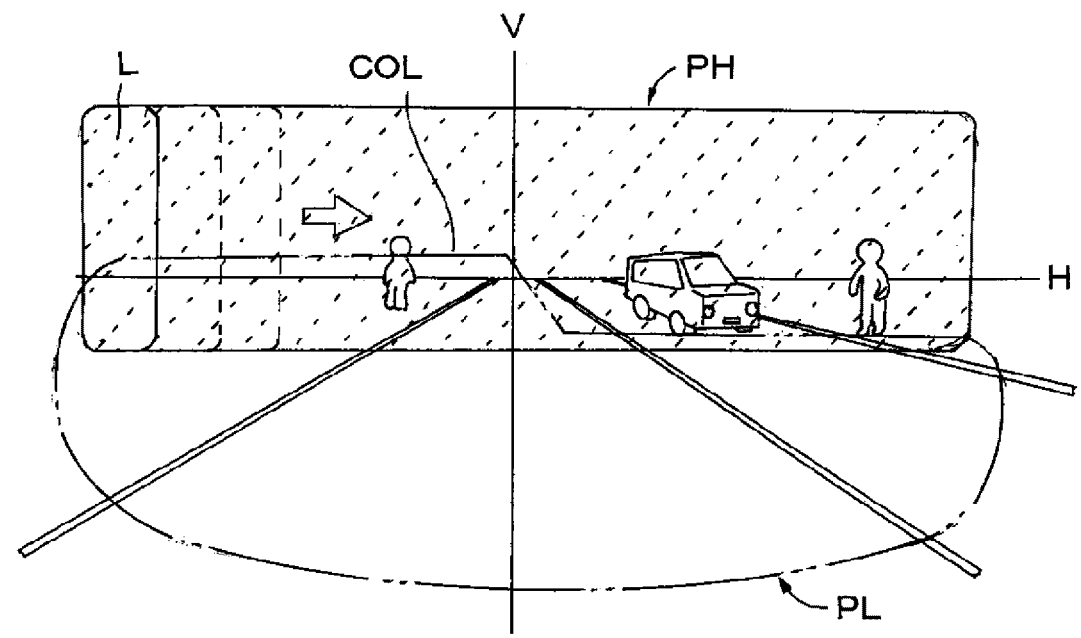
FIG. 6B is a light distribution characteristic diagram of a high beam light distribution.

In addition to the lighting of the low beam lamp unit 2, when the high beam lamp unit 3 is turned on by the high beam control unit 527 of the lamp control unit 5, a high beam light distribution region PH (Hi light distribution illumination) is illuminated in addition to the low beam light distribution region PL as shown in a light distribution characteristic diagram of FIG. 6B. That is, when the second white LED 31 emits light, the light emitted from the LED 31 is projected onto the front surfaces of the blades 71, 72 of the rotary mirror 7 and is reflected by the front surfaces of the blades 71, 72. Reflected light flux is incident on the projection lens 33, projected to front of the headlamp HL, that is, to front of the automobile, and is radiated to the front region of the automobile.

When the rotary mirror 7 is rotated by the motor 6 at the same time with the light emission of the second white LED 31, positions in the circumferential direction where the light from the second white LED 31 is incident on the front surfaces of the blades 71, 72 of the rotary mirror 7 change in the circumferential direction. Since inclination angles of the front surfaces of the blades 71, 72 change in the circumferential direction, an incident angle of the incident light flux changes in accordance with rotation of the rotary mirror 7, and a reflection angle of reflected light also changes to perform scanning in the horizontal direction. By the rotation of the rotary mirror 7, the white light (white beam) L from the second white LED 31 repeatedly performs scanning in the horizontal direction. By this scanning, as shown in the drawing, the high beam light distribution region PH in a region (region indicated by a broken line extending upward to right) above the cutoff line COL of the low beam light distribution region PL is illuminated (Hi light distribution illumination).

In the illumination (Hi light distribution illumination) of the high beam light distribution region, the imaging element 41 of the object detection device 4 captures an image of the front region (around the vehicle) of the automobile, and the image analysis unit 42 detects an object from the captured image. In an example shown in FIG. 7, pedestrians M1, M2 and an oncoming vehicle CAR are detected. When the objects are detected, the lighting control unit 52 controls a timing and a luminous intensity of the light emission of the second white LED 31 based on positions (directions) of the objects detected by the object detection device 4 and the rotation position of the rotary mirror 7 detected by the Hall element 81. Here, the lighting control unit 52 includes turning off or dimming the second white LED 31.

Figure 7:
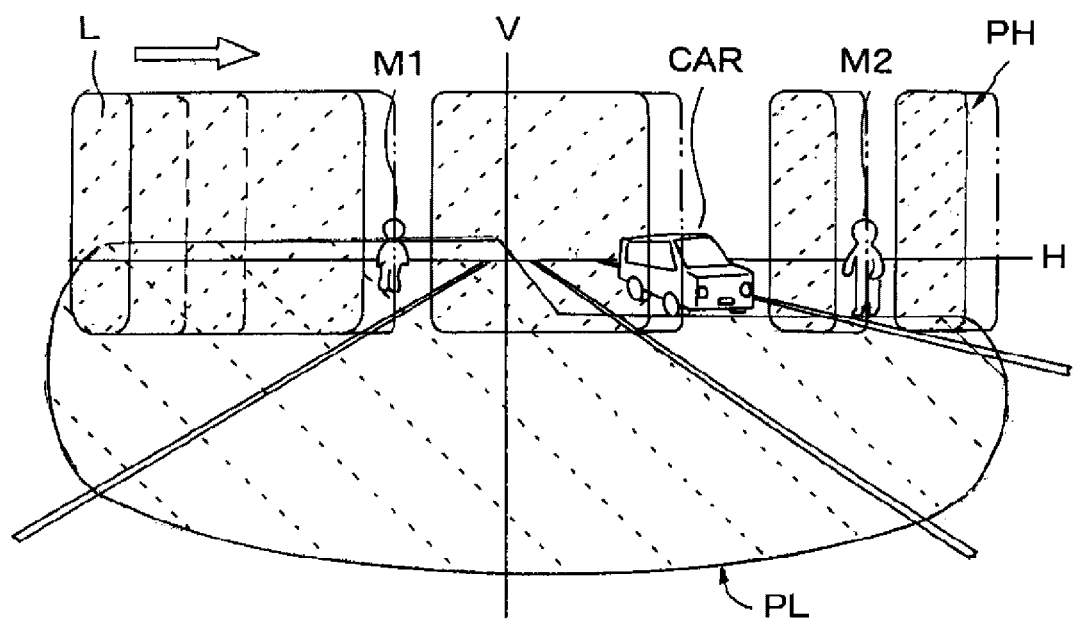
FIG. 7 is a light distribution characteristic diagram of an ADB light distribution.

Accordingly, as shown in FIG. 7, in the high beam light distribution region PH, the light beam L of the second white LED 31 is not radiated in regions where the objects M1, M2, and CAR are present, and the illumination by the high beam lamp unit 3 is limited. Regions other than the regions where the objects M1, M2, and CAR are present are illuminated at a required luminous intensity by the light beam L of the second white LED 31. Therefore, the ADB light distribution control is implemented, under which the oncoming vehicle CAR and the pedestrians M1, M2 that are the objects are not dazzled and visibility of the front region of the automobile is enhanced. Hereinafter, the Hi light distribution illumination allowing the ADB light distribution control is referred to as Hi light distribution illumination (ADB light distribution control).

Figure 8:
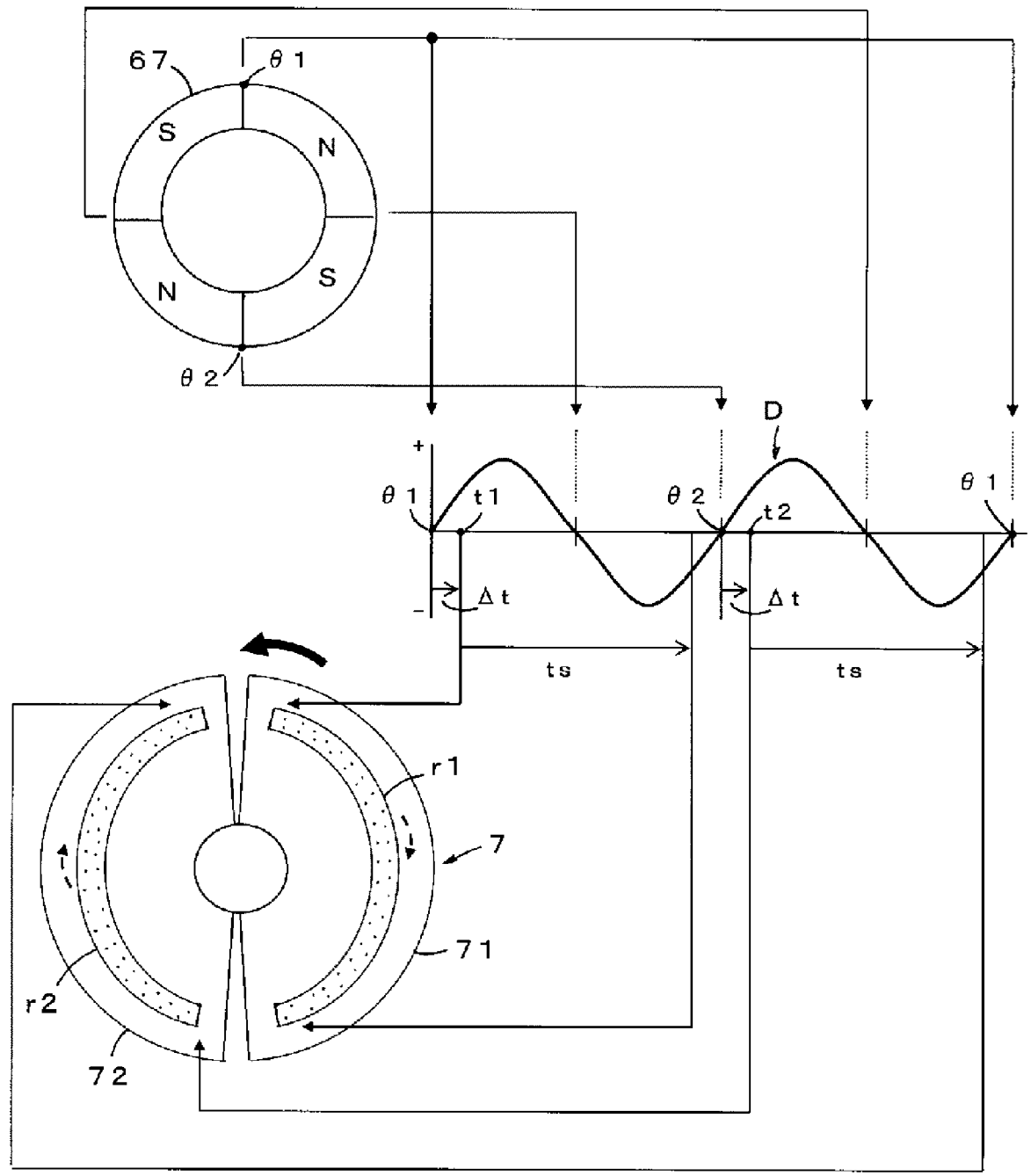
FIG. 8 shows a correlation between magnetization of a magnet in design and a scanning timing.

In the high beam lamp unit 3, the lighting control unit 52 controls the light emission of the second white LED 31 based on the detection signal of the Hall element 81. The light emission control of the second white LED 31 will be described with reference to FIG. 8. As shown in an upper part of FIG. 8, the magnet 67 includes two N poles and two S poles magnetized in the circumferential direction. When the motor 6 makes one rotation, a signal D shown in middle of FIG. 8 is output from the Hall element 81. A horizontal axis represents a rotation angle (time), and a vertical axis represents an output level. The rotation position detection unit 521 detects a first rotation position θ1 and a second rotation position θ2 at which a signal switches from negative to positive. The rotation positions θ1, θ2 correspond to rotation positions of 0° and 180° in one rotation of the rotary mirror 7.

The timing detection unit 522 detects a first timing t1 and a second timing t2 that are delayed from the rotation positions θ1, θ2 by time Δt corresponding to a predetermined rotation angle $\Delta\theta$. The light emission control unit 523 starts the light emission of the second white LED 31 based on the first timing t1, continues the light emission for predetermined time ts, and then turns off or dims the light. Subsequently, the light emission control unit 523 starts the light emission of the second white LED 31 again based on the second timing t2, continues the light emission for the predetermined time ts, and then turns off or dims the light.

Accordingly, as shown in a lower part of FIG. 8, scanning is performed in regions r1, r2 in the circumferential direction of the two blades 71, 72 of the rotary mirror 7 rotated in a counterclockwise direction, that is, in regions having the same inclination angle. Therefore, by the two blades 71, 72, reflection directions of the light that performs scanning while changing periodically and regularly, that is, illumination regions, are completely matched, and the illumination of the high beam light distribution region and the ADB light distribution control with high accuracy are implemented.

However, it is difficult to accurately manufacture four magnetic poles in a step of magnetizing the magnet 67 when manufacturing the motor 6, and an error (variation) may occur in a length of each magnetic pole in the circumferential direction. For example, as shown in an upper part of FIG. 9, even when the four magnetic poles (two N poles and two S poles) in the magnet 67 are magnetized based on the set first rotation position $\theta1$, one S pole is magnetized at a length in the circumferential direction larger than a design value, and the second rotation position $\theta2$ that is a boundary between the S pole and a next N pole may deviate in a clockwise direction from the design as a second rotation position $\theta2'$.

Here, when the rotary mirror 7 is attached to the motor 6, although a detailed description is omitted, the non-reflective region 74 of the rotary mirror 7 is detected using a photo reflector or the like, and a rotation position of the detected non-reflection region 74 is set as a reference rotation position. In addition, a boundary between an N pole and an S pole in the magnet 67 of the motor 6 is set as the first rotation position, the first rotation position is positioned relative to the reference rotation position, and the rotary mirror 7 is attached to the motor 6 in this state. Therefore, the first rotation position $\theta1$ can be accurately positioned relative to the non-reflective region 74 of the rotary mirror 7.

Figure 9:
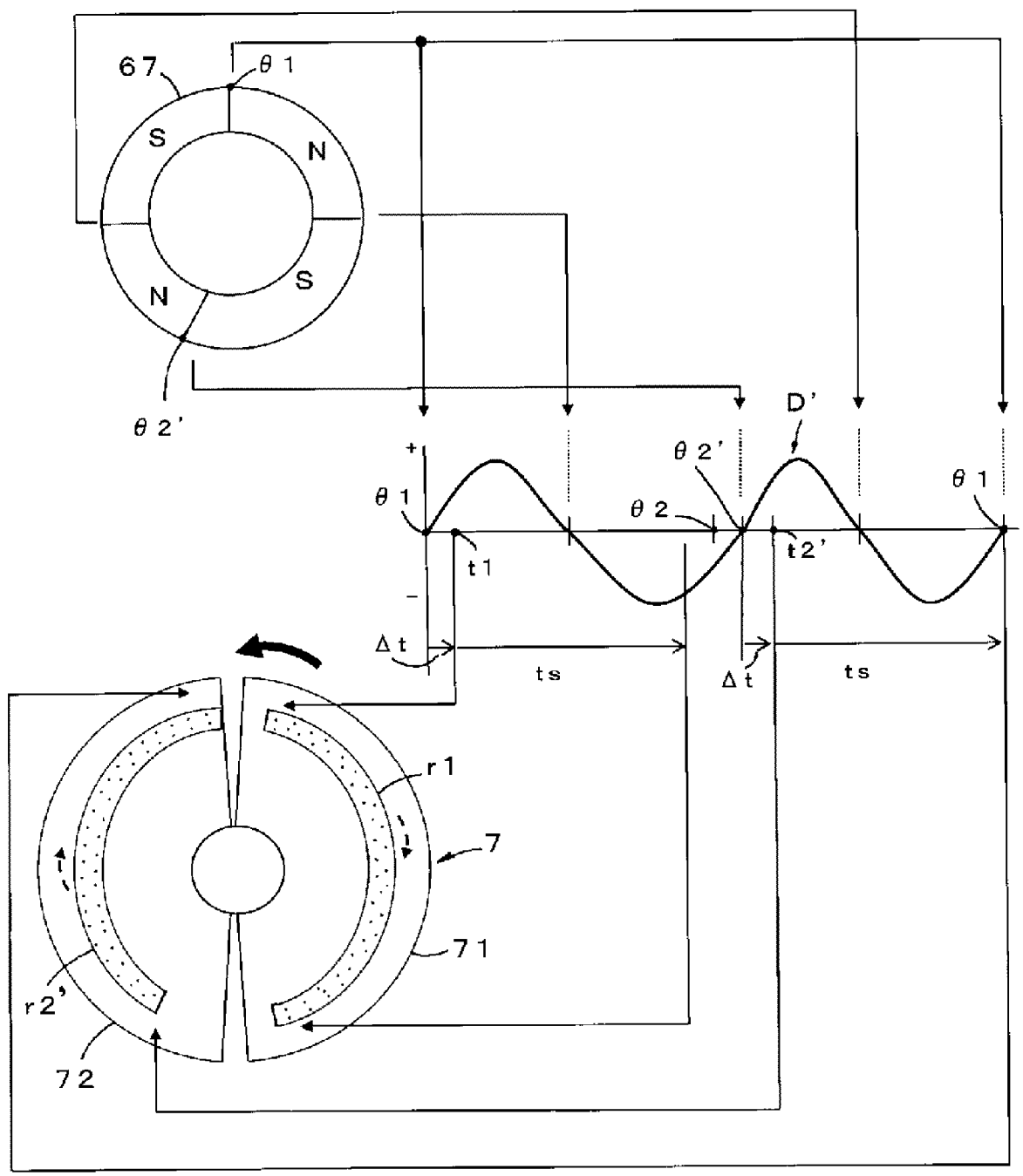
FIG. 9 shows a correlation between magnetization of a magnet and a scanning timing, which is a first problem.

When such a position deviation in which the second rotation position $\theta2$ becomes the second rotation position $\theta2'$ occurs, a signal D' shown in middle of FIG. 9 is output from the Hall element 81 when the motor 6 makes one rotation. The first rotation position $\theta1$ detected by the rotation position detection unit 521 remains the same, and the second rotation position $\theta2'$ is delayed on a time axis from the rotation position $\theta2$ in a normal state.

The timing detection unit 522 detects timings t1, t2' delayed from the rotation positions $\theta1$, $\theta2'$ by time $\Delta t$ corresponding to the predetermined rotation angle $\Delta\theta$. The light emission control unit 523 starts the light emission of the second white LED 31 based on the timings t1, t2', continues the light emission for the predetermined time ts, and then turns off or dims the light. Accordingly, as shown in a lower part of FIG. 9, in the rotary mirror 7, an inclination angle of the region r1 in the circumferential direction in one blade 71 is different from an inclination angle of a region r2' in the circumferential direction in the other blade 72, and scanning is performed in the regions r1, r2'. Therefore, reflection directions, that is, projection directions, of light that preforms scanning while changing periodically and regularly are different due to the two blades 71, 72. Due to this difference, the scanning is deviated, and it is difficult to perform the illumination of the high beam light distribution region and the ADB light distribution control with high accuracy.

In such a case, light reflected by the blade 72 becomes scan light traveling in the horizontal direction relative to light reflected by the blade 71. Therefore, when the ADB light distribution control is performed, as indicated by a two-dot chain line in FIG. 7, the scan light may be radiated to the oncoming vehicle CAR and the pedestrians M1, M2 that are the objects and the objects are dazzled. This also applies to a case where the second rotation position $\theta2'$ is earlier on the time axis than the second rotation position $\theta2$ in the normal state, and the scan light is delayed in the horizontal direction.

In the present disclosure, as shown in FIG. 4, the timing detection unit 522 of the lighting control unit 52 includes a cycle detection unit 524 and a cycle division unit 525. The cycle detection unit 524 detects time during which the rotary mirror 7 makes one rotation as a cycle 1T. The cycle division unit 525 detects a division cycle 1/2T obtained by dividing the detected cycle into half. The timing detection unit 522 outputs the first timing and the second timing to the light emission control unit 523 based on the detected cycle and division cycle, and the light emission control unit 523 controls the light emission of the second white LED 31 based on the first timing and the second timing.

Figure 10:
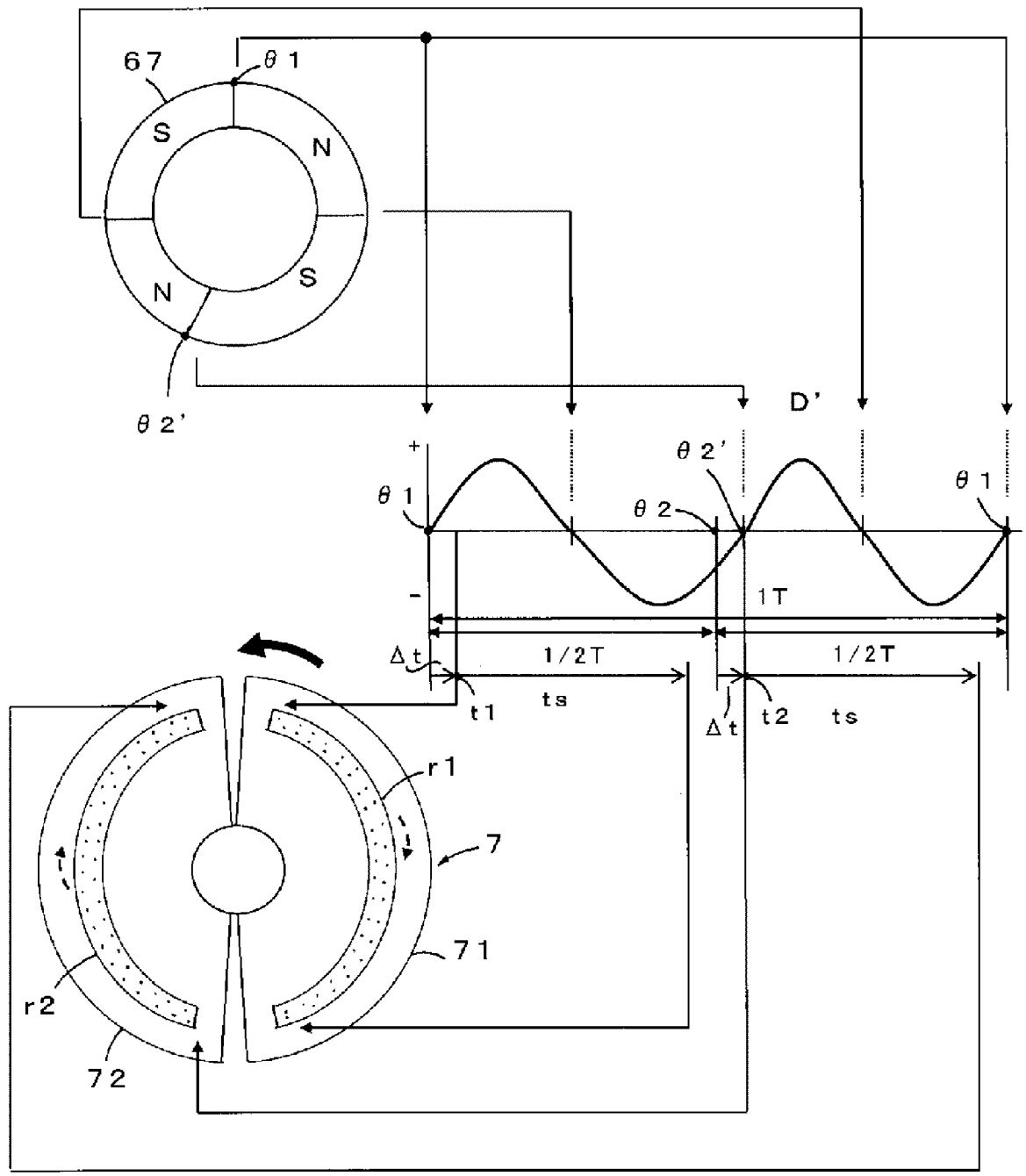
FIG. 10 shows a correlation between magnetization of a magnet and a scanning timing in the present disclosure.

Since the timing detection unit 522 includes the cycle detection unit 524 and the cycle division unit 525, a first problem shown in FIG. 9 is solved. That is, in an upper part of FIG. 10, when one S pole of the magnet 67 is magnetized at a length in the circumferential direction larger than the design value and the second rotation position $\theta2'$ that is a boundary between the S pole and the N pole is deviated in the clockwise direction from the design as in the upper part of FIG. 9, a signal D' in middle of FIG. 10 is output from the Hall element 81 when the motor 6 makes one rotation as in the middle of FIG. 9.

When the timing detection unit 522 detects the first rotation position $\theta1$ with reference to the non-reflective region 74 of the rotary mirror 7, the cycle detection unit 524 detects the cycle 1T from the first rotation position $\theta1$ to a next first rotation position $\theta1$ based on the signal D'. At this time, no second rotation position is detected. Next, the cycle division unit 525 detects the division cycle 1/2T obtained by equally dividing the detected cycle 1T into half, and outputs a rotation position corresponding to the division cycle as the second rotation position $\theta2$. That is, the second rotation position $\theta2$ is in a position of 180° in the circumferential direction of the rotary mirror 7 relative to the first rotation position $\theta1$.

The cycle detection unit 524 can detect the cycle 1T easily and accurately from the number of rotations of the motor 6 since the motor 6 performs constant speed rotational motion. The cycle division unit 525 can easily and accurately calculate the second rotation position $\theta2$ by calculating half of the cycle 1T.

The timing detection unit 522 detects the first timing t1 and the second timing t2 that are delayed from the first and second rotation positions $\theta1$, $\theta2$ by the time $\Delta t$ corresponding to the predetermined rotation angle $\Delta\theta$. The light emission control unit 523 starts the light emission of the second white LED 31 based on the first timing t1, continues the light emission for the predetermined time ts, and then turns off or dims the light. Subsequently, the light emission control unit 523 starts the light emission of the second white LED 31 based on the second timing t2, continues the light emission for the predetermined time ts, and then turns off or dims the light.

Accordingly, as in a lower part of FIG. 10, similar to the case of FIG. 8 in which the magnetic poles are correctly magnetized in the magnet 67, scanning is performed in the regions r1, r2 having the same inclination angle in the two blades 71, 72 of the rotary mirror 7. In the rotary mirror 7, reflection directions, that is, projection directions, of light that performs scanning alternately by the two blades 71, 72 are completely matched, and the illumination of the high beam light distribution region and the ADB light distribution control with high accuracy as shown by a solid line in FIG. 7 are implemented.

When the lighting control device 5 detects the rotation cycle of the motor 6 that drives the rotary mirror 7, the lighting control device 5 can control the light emission of the second white LED 31 of the high beam lamp unit 3 by detecting the first and second timings based on the rotation cycle, and implement the ADB control with high accuracy. Since it is only necessary to use a small electronic component such as a Hall element for the detection of the rotation cycle, it is possible to achieve a reduction in the size of the high beam lamp unit 3 and a reduction in the size of the headlamp HL.

The above embodiment describes an example in which the present disclosure is applied to the high beam lamp unit 3 of the headlamp, and the low beam lamp unit 2 may be a scanning lamp in which a rotary mirror is disposed. In such a case, the present disclosure can also be applied to the rotary mirror of the low beam lamp unit 2.

The embodiment describes a configuration in which the rotary mirror includes two blades. Alternatively, the rotary mirror may include three or more blades. In the present disclosure, when the number of blades is n (n is an integer of 2 or more), a cycle is equally divided into n parts by the cycle division unit of the timing detection unit.

Regarding the motor, a configuration example in which the magnet includes four magnetic poles in the circumferential direction is described, and the number of magnetic poles is not limited to four. Regarding the lighting control device, a position detection unit other than the Hall element may be used as the rotation position detection unit that detects the rotation position of the motor.

The light emission control unit may not only control light emission and light extinction of the light source but also control dimming of the light source. In addition, a configuration may be adopted in which the emission state of the light from the light source is controlled by advancing and retracting a light shielding material (shade) relative to an optical path of the light source while continuing the light emission. In particular, using a light emitting body different from a semiconductor light emitting element as the light source is effective to control light emission by the shade.

In the embodiment, the object detection device is disposed in the lamp housing. Alternatively, the present disclosure is not limited thereto, and the object detection device may be disposed in the vehicle interior where the object detection device faces the windshield, in a vehicle body panel such as in an engine room, or in a bumper.

Figure 11:
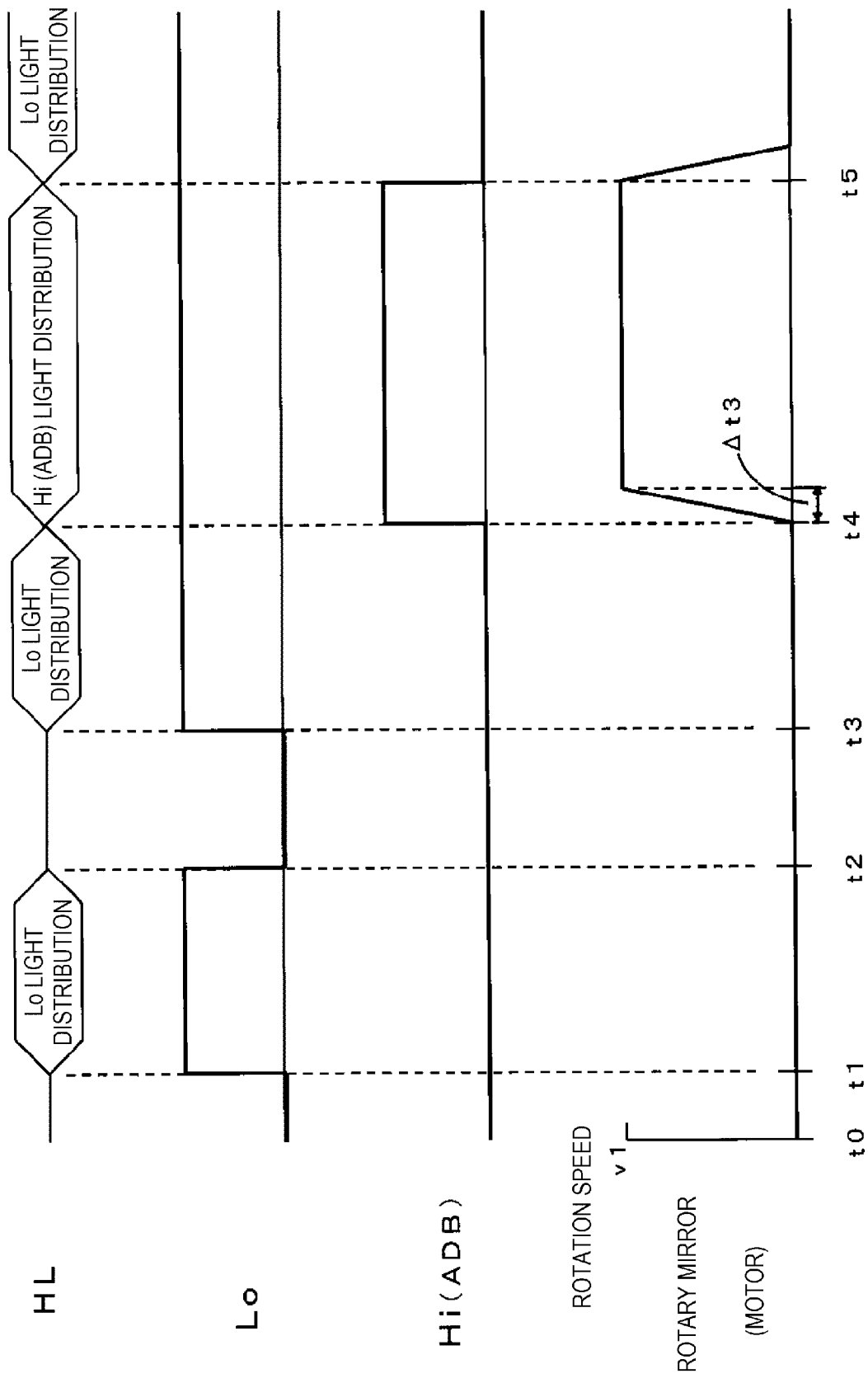
FIG. 11 is a timing chart of motor rotation control showing a second problem in the related art.

In the headlamp that performs the ADB light distribution control, when the high beam lamp unit 3 is turned on, a second problem occurs in the related art in which rotation of the rotary mirror 7 is controlled in synchronization with lighting of the high beam lamp unit 3. That is, FIG. 11 is a timing chart showing a correlation between the lighting control of the low beam lamp unit 2 and the high beam lamp unit 3 and the rotation speed of the rotary mirror 7 (motor 6). Hereinafter, the rotation of the rotary mirror 7 will be described as the rotation of the motor 6. A horizontal axis represents a change in time (t). The low beam lamp unit 2 is turned on during t1 to t2 and from t3 on, and the high beam lamp unit 3 is also turned on during t4 to t5, in which t1 and t3 are time points when the low beam lamp unit 2 is turned on, t4 is a time point when the high beam lamp unit 3 is turned on, and t5 is a time point when the high beam lamp unit 3 is turned off. In the lighting control, when the rotation of the motor 6 is simply started at the same time as the light emission of the second white LED 31 of the high beam lamp unit 3, the rotation speed is not stabilized during rise time Δt3 until the motor 6 reaches a first rotation speed v1, and light distribution characteristics of the Hi light distribution illumination (ADB light distribution control) is deteriorated.

Figure 12:
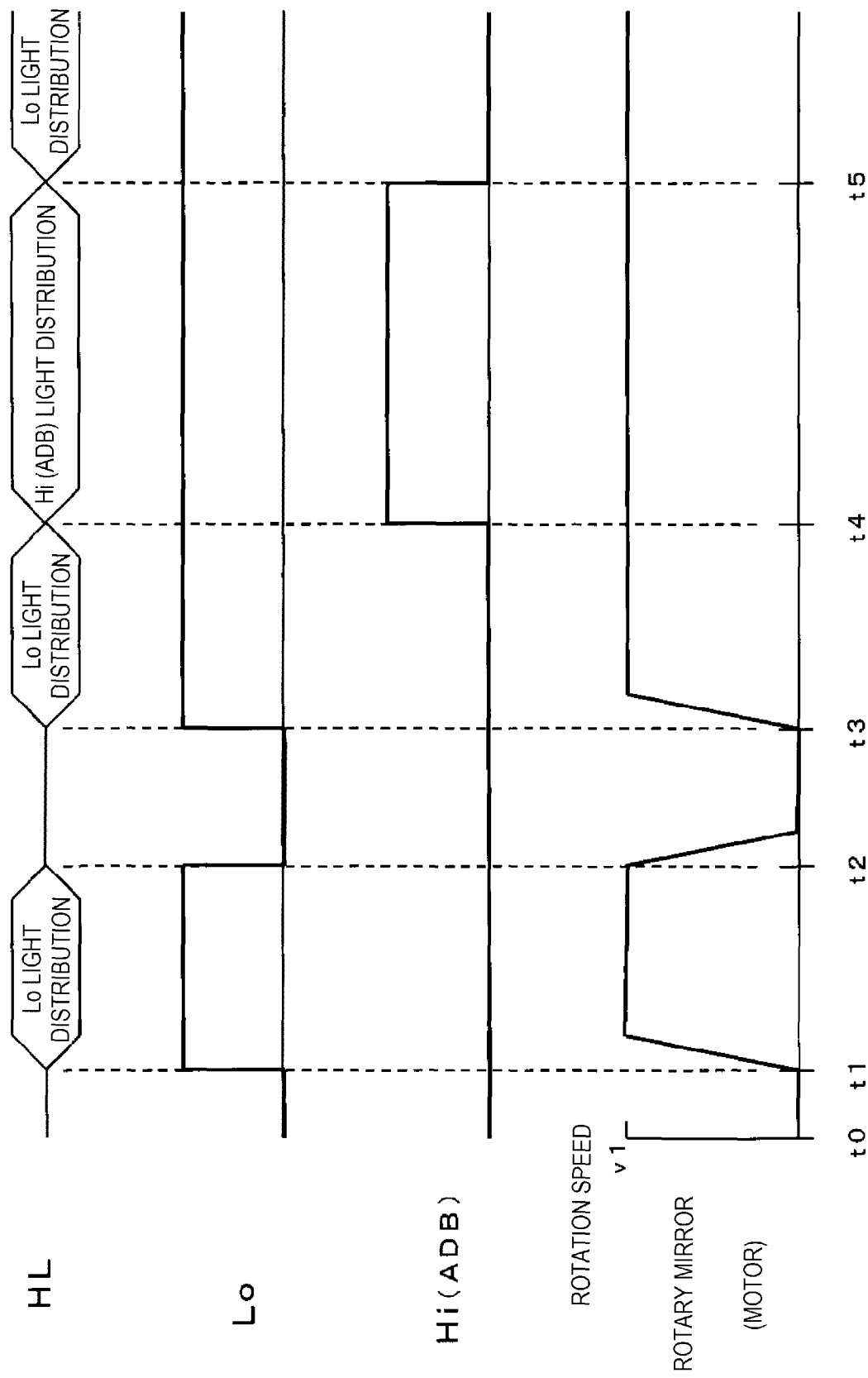
FIG. 12 is a timing chart of motor rotation control showing a third problem in the related art.

Although Patent Literature 2 discloses a solution to solve the second problem, a third problem may occur in Patent Literature 2. In Patent Literature 2, when the low beam lamp unit 2 is turned on as shown in FIG. 12, the rotation of the motor 6 is controlled at the first rotation speed v1 regardless of whether the high beam lamp unit 3 is turned on or off. That is, in Patent Literature 2, the motor 6 is controlled to rotate not only during t4 to t5 during which the high beam lamp unit 3 is turned on, but also during t1 to t2, t3 to t4, and from t5 on during which only the low beam lamp unit 2 is turned on.

According to Patent Literature 2, the motor 6 has already reached the predetermined first rotation speed v1 when the high beam lamp unit 3 is turned on and the Hi light distribution illumination (ADB light distribution control) is started. This prevents flickering of the illumination due to a change in the rotation speed of the motor 6 during the rise time Δt3 of the motor 6. In addition, when the high light distribution illumination (ADB light distribution control) is set, the lamp switch LSW is always turned on in advance to light the low beam lamp unit 2, and thus the motor 6 has reached the first rotation speed v1 when the high beam lamp unit 3 is turned on.

Further, according to Patent Literature 2, the motor 6 is rotated even during the Lo light distribution illumination in which the high beam lamp unit 3 is turned off. Accordingly, an increase in viscosity of lubricating oil of the bearings (ball bearings) 64 of the motor 6 when the motor 6 is stopped is prevented, and life of the bearings 64 is prevented from being shortened due to a decrease in lubricity. However, since the motor 6 is rotated at the first rotation speed v1 even when the Hi light distribution illumination (ADB light distribution control) is stopped, the total number of rotations of the motor 6 increases, wear of the bearings 64 becomes a problem, and the life of the motor 6 is shortened, which is the third problem.

In the present disclosure, when the low beam lamp unit 2 is turned on by the lighting control unit 52 in the lamp control unit 5, as in the related art, the motor 6 is rotated by the motor control unit 51 at the same time as when the low beam lamp unit 2 is turned on. When the high beam lamp unit 3 is turned on in addition to the low beam lamp unit 2, the motor 6 is rotated at the first rotation speed v1, and Hi light distribution illumination (ADB light distribution control) is performed.

On the other hand, when the high beam lamp unit 3 is not emitting light even when the low beam lamp unit 2 is turned on, that is, in the Lo light distribution illumination in which only the low beam lamp unit 2 is turned on, the lamp control unit 5 controls the motor 6 to rotate at a speed lower than the first rotation speed v1. An embodiment of the rotation control of the motor 6 will be described below.

First Embodiment

Figure 13:
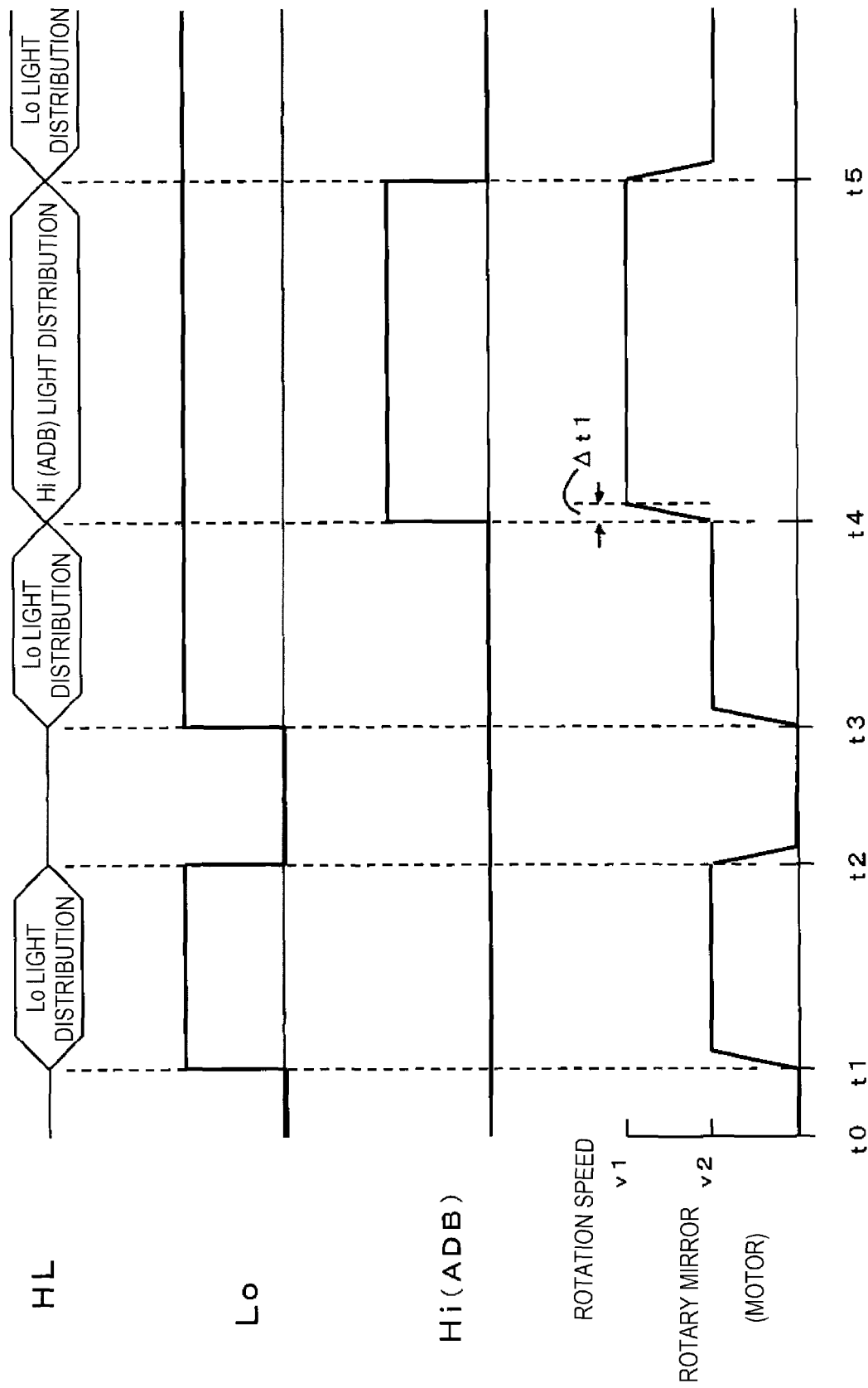
FIG. 13 is a timing chart of lighting control according to a first embodiment of the present disclosure.

FIG. 13 is a timing chart showing a correlation between lighting states of the low beam lamp unit 2 and the high beam lamp unit 3 and a rotation speed of the motor 6 according to the first embodiment. On a horizontal axis, t1 to t5 are time points. The headlamp HL is turned off during t0 to t1 and t2 to t3. That is, both the low beam lamp unit 2 and the high beam lamp unit 3 are turned off. During t1 to t2, t3 to t4, and from t5 on, Lo light distribution illumination is performed in which only the low beam lamp unit 2 is turned on. During t4 to t5, the high beam lamp unit 3 is also turned on and Hi light distribution illumination and ADB light distribution control are performed.

During t1 to t2 and t3 to t4 of the Lo light distribution illumination, the high beam lamp unit 3 is turned off, but the motor 6 is rotated. The rotation speed of the motor 6 is controlled to a second rotation speed v2 (another rotation speed) lower than the first rotation speed v1 when the Hi light distribution illumination (ADB light distribution control) is performed (v1>v2). Here, the second rotation speed v2 is set to a rotation speed that is 50% of the first rotation speed v1.

In the Hi illumination and the ADB light distribution control of t4 to t5 in which the high beam lamp unit 3 is turned on in addition to the Lo light distribution illumination, the rotation speed of the motor 6 is increased from the second rotation speed v2 to the first rotation speed v1. Accordingly, in the high beam lamp unit 3, optical scanning is performed by the rotary mirror 7, and the high beam region PH (ADB light distribution control) is illuminated. At this time, since the motor 6 is accelerated from the second rotation speed v2, which is 50% of the first rotation speed v1, to the first rotation speed v1, rise time Δt1 until the motor 6 reaches the first rotation speed v1 is fairly short as compared with a case where the motor 6 starts to rotate from a stopped state.

Since the motor 6 is continuously controlled to rotate even in the Lo light distribution illumination, lubricity of lubricating oil in the bearings 64 is prevented from decreasing. Therefore, even when a temperature of the headlamp HL increases by the lighting of the low beam lamp unit 2 and a temperature of the motor 6 increases, the lubricity of the lubricating oil can be prevented from decreasing.

Further, since the motor 6 is continuously rotated even when the Hi light distribution illumination (ADB light distribution control) ends and the Lo light distribution illumination is performed, there is a concern about an influence of wear in the bearing 64 of the motor 6. However, since the rotation speed of the motor 6 is the second rotation speed v2 that is 50% of the first rotation speed v1, an increase in a total rotation number of the motor 6 relative to rotation time can be prevented from increasing and the life of the motor 6 can be extended.

When the headlamp HL is turned off as during t2 to t3, the rotation of the motor 6 is also stopped. However, the lubricity of the lubricating oil in the bearing 64 of the motor 6 is prevented from decreasing even when the rotation of the motor 6 is stopped since the temperature of the motor 6 hardly rises when the headlamp HL is turned off.

Second Embodiment

FIG. 14 is a timing chart of lighting of the low beam lamp unit 2 and the high beam lamp unit 3 and rotation control of the motor 6 by the lamp control unit 5 according to the second embodiment. In the second embodiment, similarly to the first embodiment, the motor 6 is rotated at the first rotation speed v1 in Hi light distribution illumination (ADB light distribution control), and is rotated at the second rotation speed v2 lower than the first rotation speed v1 in Lo light distribution illumination.

On the other hand, in the second embodiment, when the Hi light distribution control (ADB light distribution control) is shifted to the Lo light distribution illumination at t5, that is, when only the high beam lamp unit 3 of the low beam lamp unit 2 and the high beam lamp unit 3 that were turned on is turned off, a rotation speed of the motor 6 is controlled to a third rotation speed v3 (another rotation speed) higher than the second rotation speed v2 (v1>v3>v2) during predetermined transition time tx (predetermined time from when the high beam lamp unit 3 is turned off) thereafter, as indicated by a solid line in FIG. 14. Here, the third rotation speed v3 is 70% of the first rotation speed v1. The transition time tx is set in advance in the timer 512 of the motor control unit 51 shown in FIG. 5.

In the second embodiment, similarly to the first embodiment, the motor 6 is continuously controlled to rotate even when only the low beam lamp unit 2 is turned on, and thus lubricity of lubricating oil is prevented from decreasing. Further, since the motor 6 is continuously rotated at the second rotation speed v2 or the third rotation speed v3 lower than the first rotation speed v1 even when the high beam lamp unit 3 is turned off, a total rotation number of the motor 6 relative to rotation time can be prevented from increasing and life of the motor 6 can be extended.

In the second embodiment, as indicated by a two-dot chain line in FIG. 14, when the high light distribution illumination (ADB light distribution control) is switched to the low light distribution illumination at t5, the rotation speed of the motor 6 may be continuously decreased from the first rotation speed v1 toward the second rotation speed v2 during the transition time tx.

Alternatively, although not shown, the rotation speed of the motor 6 may be decreased stepwise from the first rotation speed v1 toward the second rotation speed v2 in the transition time tx, instead of being continuously decreased from the first rotation speed v1 toward the second rotation speed v2.

Further, in the second embodiment, as shown in FIG. 15, when the Hi light distribution illumination (ADB light distribution control) is switched to the Lo light distribution illumination at t5, the motor 6 is rotated at the third rotation speed v3 during the transition time tx. Therefore, when the Lo light distribution illumination is switched to the Hi light distribution illumination (ADB light distribution control) again at t6 during the transition time tx, the motor 6 is accelerated from the third rotation speed v3, which is 70% of the first rotation speed, to the first rotation speed v1. Accordingly, rise time Δt2 until the rotation speed reaches the first rotation speed v1 is short as compared with a case where the motor is rotated at the second rotation speed v2 as in the first embodiment, and an effect of preventing flickering of illumination due to fluctuation of the rotation speed is enhanced.

In the second embodiment, the rotation speed is reduced to the second rotation speed v2 after the predetermined transition time tx elapses, which is the same as that in the first embodiment. In this way, when the Lo light distribution illumination is not switched to the Hi light distribution illumination (ADB light distribution control) even after the transition time tx elapses, the life of the bearings 64 can be prioritized rather than considering rise time in the motor 6.

In the first and second embodiments, the second rotation speed v2 is 50% of the first rotation speed v1, and in the second embodiment, the third rotation speed v3 is 70% of the first rotation speed v1. When the life of the bearings is prioritized, the second rotation speed v2 is set to be lower than 50% of the first rotation speed v1, and when rise characteristics of the motor is prioritized, the second rotation speed v2 is set to be higher than 50% of the first rotation speed v1.

In the second embodiment, the lamp control unit 5 may monitor a switching state between the Lo light distribution illumination and the Hi light distribution control (ADB light distribution control), and may perform control at the third rotation speed v3 when a switching frequency within predetermined time is high and perform control at the second rotation speed v2 when the switching frequency is low. Alternatively, the lamp control unit 5 may perform control by appropriately changing at least one of the second rotation speed v2 and the third rotation speed v3 according to the degree of frequency.

In the first and second embodiments, the present disclosure is applied to a headlamp that includes a low beam lamp unit and a high beam lamp unit as vehicle lamps and performs ADB light distribution control. Alternatively, the present disclosure is also applicable to a lamp including a rotary scanning unit that uses a motor or the like as a drive source, such as a rotary mirror.

A motor that rotationally drives a rotary mirror is not limited to the brushless motor described in the embodiments, and the present disclosure is applicable to a motor having a configuration in which a bearing is lubricated by a lubricant. A bearing is not limited to the ball bearing described in the embodiments, and may be a sliding bearing.

The present application claims priority from Japanese Patent Application No. 2019-114172 filed on Jun. 20, 2019 and Japanese Patent Application No. 2019-114173 filed on Jun. 20, 2019, contents of which are incorporated herein by reference in their entirety.

The invention claimed is:

1. A vehicle lamp comprising:
a light source;
a lighting control unit configured to control an emission timing of light emitted from the light source; and
a rotary scanning unit configured to repeatedly perform scanning with the light emitted from the light source while rotating,
wherein the vehicle lamp illuminates a predetermined region with scan light,
wherein the rotary scanning unit performs plural repetitive scans in one rotation,
wherein the lighting control unit detects a rotation cycle of the rotary scanning unit, and controls the emission timing of the light source at a timing obtained by equally dividing the detected rotation cycle,
wherein the rotary scanning unit includes a rotary minor, the rotary mirror including plural light reflecting blades of the same shape arranged in a rotation direction, and a motor configured to rotationally drive the rotary mirror,
wherein the lighting control unit includes a cycle detection unit configured to detect a rotation cycle of the motor, and a cycle division unit configured to detect a division cycle obtained by equally dividing the detected rotation cycle into plural parts, and
wherein the lighting control unit controls the emission timing of the light source based on the detected rotation cycle and the detected division cycle.

2. The vehicle lamp according to claim 1,
wherein the cycle division unit divides the detected rotation cycle by a number of the plural light reflecting blades of the rotary scanning unit and calculates the division cycle.

3. The vehicle lamp according to claim 2,
wherein the motor includes a rotor including a magnet in which plural pairs of magnetic poles of S poles and N poles are magnetized in a circumferential direction,
wherein the motor is provided with a Hall element configured to detect a change in magnetic poles caused by rotation of the magnet, and
wherein the lighting control unit controls the emission timing of the light source based on detection of the Hall element.

4. The vehicle lamp according to claim 3,
wherein one magnetic pole of the plural pairs of magnetic poles is located corresponding to one light reflecting blade of the plural light reflecting blades in the circumferential direction,
wherein the lighting control unit sets a first timing based on a position of the light reflecting blade in the circumferential direction,
wherein the cycle detection unit detects the rotation cycle based on a repetition cycle of the first timing, and
wherein the lighting control unit sets a second timing based on a timing obtained by equally dividing the detected rotation cycle.

5. The vehicle lamp according to claim 1,
wherein each of the plural light reflecting blades has a shape in which an inclination angle of a light reflecting surface relative to a rotation shaft gradually changes along the rotation direction.

6. The vehicle lamp according to claim 1,
wherein the light source is a semiconductor light emitting element, and
wherein the lighting control unit controls a light emission timing of the semiconductor light emitting element.

7. The vehicle lamp according to claim 1, further comprising:
an object detection unit configured to detect an object present in an illumination region,
wherein the lighting control unit controls the emission timing of the light source at a timing of scanning the region in which the object detected by the object detection unit is present, and
wherein the vehicle lamp is a headlamp that performs illumination with an ADB light distribution.

8. A vehicle lamp comprising:
a first lamp configured to perform illumination with a first light distribution;
a second lamp configured to perform illumination with a second light distribution different from the first light distribution; and
a lamp control unit configured to control a rotation speed of a rotary scanning unit of the second lamp,
wherein the second lamp includes the rotary scanning unit configured to perform scanning with light emitted from a light source while rotating, and
wherein the lamp control unit controls the rotation speed of the rotary scanning unit when the first lamp is turned on and the second lamp is turned on to be a first rotation speed, and controls the rotation speed of the rotary scanning unit when the first lamp is turned on and the second lamp is turned off to be another rotation speed lower than the first rotation speed.

9. The vehicle lamp according to claim 8, further comprising:
an object detection unit configured to detect an object present around a vehicle,
wherein the first lamp is a lamp that performs illumination with a low beam light distribution,
wherein the second lamp is a lamp that performs illumination with an ADB light distribution, and
wherein the lamp control unit turns on the second lamp and controls the rotary scanning unit based on detection of the object detection unit.

10. The vehicle lamp according to claim 8,
wherein the rotary scanning unit includes a motor and a rotary mirror configured to be rotationally driven by the motor and reflect the light emitted from the light source in different directions according to a change in a rotation position.

11. The vehicle lamp according to claim 10,
wherein the motor includes a bearing lubricated by a lubricant.

12. The vehicle lamp according to claim 8,
wherein the lamp control unit controls the rotation speed of the rotary scanning unit when the second lamp is turned off to be a second rotation speed lower than the first rotation speed.

13. The vehicle lamp according to claim 8,
wherein the lamp control unit controls the rotation speed of the rotary scanning unit to a third rotation speed lower than the first rotation speed and higher than a second rotation speed lower than the first rotation speed during predetermined time from when the second lamp is turned off.

14. The vehicle lamp according to claim 8,
wherein the lamp control unit continuously or stepwise changes the rotation speed of the rotary scanning unit from the first rotation speed to a second rotation speed lower than the first rotation speed during predetermined time from when the second lamp is turned off.

15. A method for controlling a vehicle lamp, the vehicle lamp including a first lamp that performs illumination with a first light distribution, a second lamp that performs illumination with a second light distribution different from the first light distribution, and a lamp control unit that controls a lighting state of a light source of the second lamp,
wherein the second lamp includes a rotary scanning unit configured to perform scanning with light emitted from the light source, and
wherein the method for controlling the vehicle lamp comprises:
controlling, by the lamp control unit, a rotation speed of the rotary scanning unit to be a first rotation speed when the first lamp is turned on and the second lamp is turned on, and controlling the rotation speed of the rotary scanning unit to be a second rotation speed lower than the first rotation speed when the first lamp is turned on and the second lamp is turned off.

* * * * *